United States Patent

[11] 3,581,869

| | | | |
|---|---|---|---|
| [72] | Inventor | Hendrikus Gerhardus Muller<br>Hengelo, Netherlands | |
| [21] | Appl. No. | 807,316 | |
| [22] | Filed | Mar. 14, 1969 | |
| [45] | Patented | June 1, 1971 | |
| [73] | Assignee | N.V. Machinefabriek B & S Bedrijven v.d.<br>Woerdt<br>Hengelo, Netherlands | |
| [32] | Priority | Mar. 14, 1968 | |
| [33] | | Netherlands | |
| [31] | | 68.03638 | |

[54] APPARATUS FOR FEEDING ARTICLES TO A CONVEYOR IN UNIFORMLY ORIENTED CONDITION
4 Claims, 2 Drawing Figs.

[52] U.S. Cl. .................................................. 198/33,
193/43
[51] Int. Cl. ...................................................... B65g 47/24
[50] Field of Search .......................................... 198/33, 33
R3, 33 R4; 193/43; 214/1 R, 1 R7

[56] References Cited
UNITED STATES PATENTS

| | | | |
|---|---|---|---|
| 1,425,374 | 8/1922 | Elgy .......................... | 198/33R4UX |
| 1,967,228 | 7/1934 | Drevitson .................... | 193/43(B)X |
| 2,271,213 | 1/1942 | Weidner et al. ............. | 214/1RAUX |
| 2,534,221 | 12/1950 | Borkmann ................... | 198/33(.4) |
| 3,112,829 | 12/1963 | Modder ....................... | 214/1(R7) |

FOREIGN PATENTS

| | | | |
|---|---|---|---|
| 751,303 | 6/1956 | Great Britain ............... | 214/1(RA) |
| 74,697 | 2/1949 | Norway ....................... | 198/33(.4) |
| 103,357 | 2/1964 | Norway ....................... | 214/1(R) |

*Primary Examiner*—Gerald M. Forlenza
*Assistant Examiner*—Frank E. Werner
*Attorney*—Young and Thompson

ABSTRACT: Articles such as shrimps, having their center of gravity offset to one side, are fed to a moving belt conveyor in uniformly oriented condition by a pair of plates disposed about the conveyor and mounted for vertical swinging movement about their adjacent edges. With the plates both horizontal, the article is positioned on the plates so that it rests on both plates. The plates are then swung downwardly, and the article will slide down the plate that its center of gravity overlies. If it slides down the plate inclined in the direction of conveyor movement, then it retains the same orientation on the conveyor; but if it slides down the oppositely inclined plate, then when it contacts the conveyor it will be flipped over by the action of the conveyor passing under that latter plate.

PATENTED JUN 1 1971
3,581,869
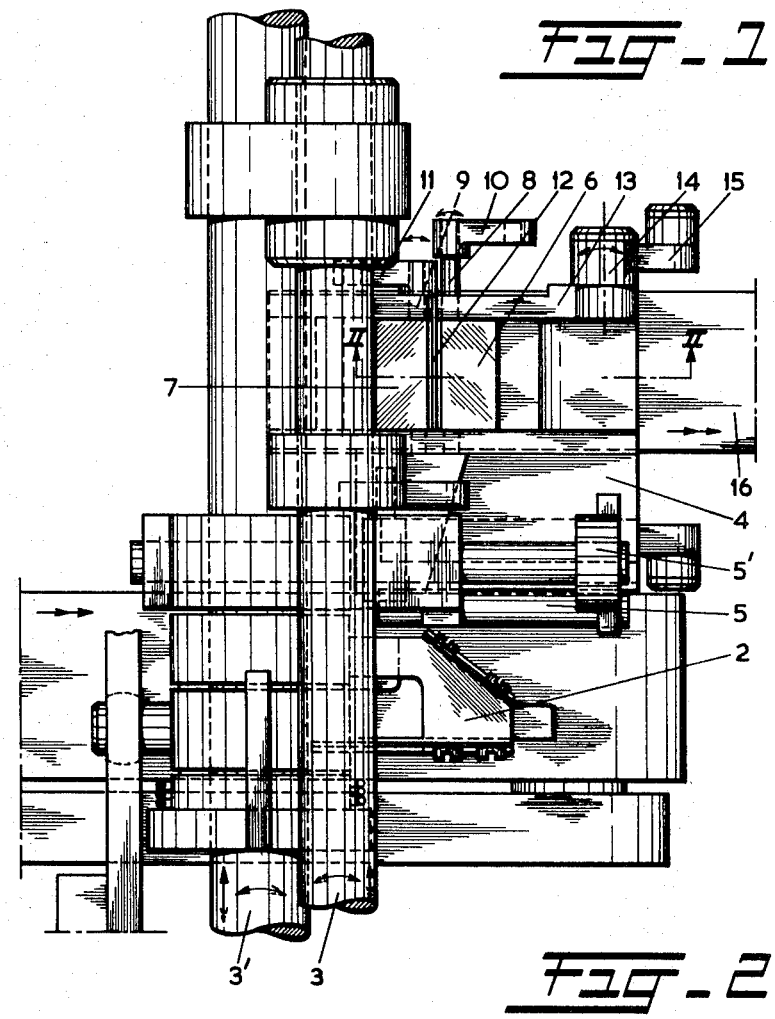
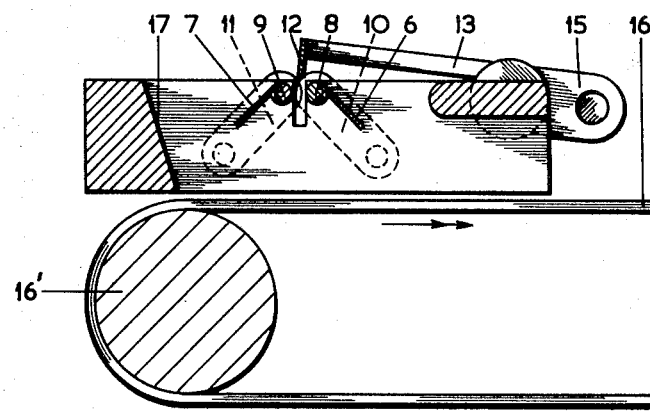
INVENTOR
HENDRIKUS GERHARDUS MULLER
BY Young + Thompson
ATTORNEYS

APPARATUS FOR FEEDING ARTICLES TO A CONVEYOR IN UNIFORMLY ORIENTED CONDITION

The present invention relates to the feeding of articles to a belt conveyor in uniformly oriented relationship. The invention is useful in connection with articles whose center of gravity is offset, that is, whose center of gravity is nearer one side of the article than the opposite side of the article. The invention has particular utility in the handling of shrimps, whose center of gravity is displaced in the direction of the convexity of the cooked and curled shrimp; and the invention will accordingly be described and illustrated in connection with apparatus for handling shrimps.

It is an object of the present invention to provide apparatus for feeding articles to a belt conveyor in uniformly oriented relationship, which is not dependent on the size or shape of the article but rather on the location of its center of gravity.

Another object of the present invention is the provision of such an apparatus, in which the belt conveyor itself cooperates to perform the orienting function.

Finally, it is an object of the present invention to provide such an apparatus, which will be relatively simple and inexpensive to construct, easy to install, operate, maintain and repair, and rugged and durable in use.

Other objects and advantages of the present invention will become apparent from a consideration of the following description, taken in connection with the accompanying drawing, in which:

FIG. 1 is a top plan view of apparatus according to the present invention; and

FIG. 2 is an enlarged fragmentary cross-sectional view taken on the line II–II of FIG. 1.

Referring now to the drawing in greater detail, there is shown an apparatus for feeding shrimps to a belt conveyor in uniformly oriented relationship. The shrimps arrive at the apparatus on a belt conveyor 1, one-by-one, in randomly oriented relationship and perhaps also with undersized pieces present, as well as shrimps which are improperly curved, that is, that are too far open or even straight. These shrimps and other pieces move to the right on conveyor 1, as seen in FIG. 1, until they reach a catching member 2 which is open at its front and has upright sidewalls that converge toward its open rear end. Undersized and straight shrimps and small pieces of shrimp pass through the open rear end of catching member 2, while curved shrimps are retained by the catching member 2. Catching member 2, the parts of which are mounted on shafts 3 and 3 , is then slid horizontally by axial reciprocation of shafts 3 and 3' to deposit the shrimp on a support 4; and shafts 3 and 3' are then rotated to raise the catching member 2 out of contact with the shrimp for return movement to the position shown in FIG. 1.

On the support 4, a slide 5 parallel to conveyor 1 and a slide 5' perpendicular to conveyor 1 then move the shrimp, with the same orientation the shrimp had in catching member 2, horizontally onto a pair of plates 6 and 7 which in their initial position shown in FIG. 1, when they receive the shrimp, are horizontal and coplanar with each other and coplanar with conveyor 1 and support 4.

The operation and coaction of conveyor 1, catching member 2, shafts 3 and 3', support 4 and slides 5 and 5' are all set forth in detail in the copending application of the same inventorship, filed under even date herewith and entitled "Apparatus for Classifying Articles and for Removing Them From a Conveyor".

In any event, one shrimp at a time will rest on plates 6 and 7 with a portion of the shrimp on plate 6 and another portion of the shrimp on plate 7. However, catching member 2 does not guarantee the proper orientation of the shrimp. Instead, the shrimp can be retained in catching member 2 either with its convex back pointing to the right in FIG. 1, or with its convex back pointing to the left in FIG. 1. Therefore, the shrimp will arrive on plates 6 and 7 in one of those two positions.

Moreover, the center of gravity of a curled shrimp is somewhat nearer the convex side of the shrimp than the opposite side of the shrimp. Accordingly, those shrimps which rest on plates 6 and 7 with their convex back pointing to the right in FIG. 1 will have their center of gravity a little to the right of the midline between the plates 6 and 7 as seen in FIG. 1; while those shrimps that rest on plates 6 and 7 with their convex backs pointing to the left as seen in FIG. 1 will have their center of gravity a little to the left of the midline of plates 6 and 7 as seen in FIG. 1.

Plates 6 and 7 are mounted for vertical swinging movement, between horizontal positions and inclined positions, about parallel horizontal axes that are disposed as closely adjacent as possible to the contiguous edges of plates 6 and 7. Thus, plate 6 is mounted for vertical swinging movement on a horizontal shaft 8 while plate 7 is mounted for vertical swinging movement on a shaft 9. Shafts 8 and 9 are parallel to each other and disposed in a common horizontal plane. Shaft 8 is rotatable under the influence of an arm 10, while shaft 9 is rotatable under the influence of an arm 11. Conventional transmission means (not shown) are provided for simultaneously swinging arms 10 and 11 vertically in opposite directions so that plates 6 and 7 swing between the horizontal position of FIG. 1 and the inclined positions of FIG. 2.

Disposed between the contiguous edges of plates 6 and 7 is a narrow vertical strip 12 carried by an arm 13 for limited vertical swinging movement about a shaft 14 under the influence of an arm 15. Strip 12 moves upwardly just before or simultaneously with the downward swinging movement of the plates 6 and 7, from a position in which the horizontal upper edge of strip 12 is no higher than the upper surfaces of the horizontal plates 6 and 7, to the raised position of strip 12 seen in FIG. 2. The purpose of strip 12 is to force the shrimp to overbalance in one direction or the other, according to its orientation, and to slide down the corresponding plate 6 or 7. But for strip 12, the shrimp might continue to rest on and between plates 6 and 7 even in the FIG. 2 position of the plates.

If the shrimp overbalances to the plate 6 side, then it slides downward to the right as seen in FIG. 2 and lands on a subjacent endless belt conveyor 16 which is disposed about a roller 16' and about another roller (not shown). It will of course be understood that one of the rollers of conveyor 16 is power driven by conventional mechanism (not shown), so that the upper run of conveyor 16 continuously moves to the right as shown by the arrow in FIG. 2. Shrimps sliding down plate 6 with their curved back to the lead maintain the same orientation when they reach conveyor 16 and are thus carried to the right on the conveyor 16 with their curved back foremost.

In the other direction, the shrimps whose curved backs are directed toward the left as seen in FIG. 1 will slide on the plate 7 downwardly toward the left in FIG. 2. In its FIG. 2 position, the lower edge of plate 7 is spaced above conveyor 16 a distance such that the shrimp does not fall freely at any time. When the shrimp is in contact with conveyor 16, it will also be in contact with the lower edge of plate 7. To prevent the shrimp from sliding to the left off conveyor 16 or out of contact with plate 7, a detent 17 is provided whose surface which is contacted by the shrimp is inclined downwardly to the right as seen in FIG. 2 thereby to direct the shrimp toward conveyor 16 and to limit the leftward movement of the shrimp. The distance between the lower edge of plate 7 and conveyor 16 is preferably about equal to the distance between the lower edge of plate 7 and the portion of detent 17 that is contacted by the falling shrimp.

The shrimp which is thus in contact both with the lower edge of plate 7 and with the upper surface of conveyor 16 will have its lower end moved by friction with conveyor 16 to the right as seen in FIG. 2, while its upper end is retarded. The shrimp will thus flip over, into the same position as the shrimps which slide down plate 6, with the result that all the shrimps will lie on conveyor 16 with the same orientation, namely, with their convex backs pointing to the right in FIGS. 1 and 2, regardless of whether they slide down plate 6 or plate 7, and regardless of their orientation when they arrived on plates 6 and 7.

As indicated above, it is of course understood that the mechanisms for moving conveyors 1 and 16, shafts 3 and 3', catching member 2, slides 5 and 5', and arms 10, 11 and 15 are all coordinated by conventional transmissions such as gears and cams and levers so that they operate in the desired time sequence. Such transmission mechanism is well known to persons having ordinary skill in this art and need not be disclosed in detail in the present application.

In view of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

I claim:

1. Apparatus for feeding articles in uniformly oriented condition, comprising a belt conveyor, a pair of horizontal plates disposed in a common plane above the belt conveyor, means mounting said plates for downward swinging movement simultaneously out of said horizontal position downwardly in opposite directions about axes disposed side by side and parallel to each other and perpendicular to the direction of travel of the subjacent belt conveyor, and means for placing articles one by one on said plates so that each article rests partly on one plate and partly on the other plate with its center of gravity above only one of said plates.

2. Apparatus as claimed in claim 1, and a member disposed between said plates and having an upper surface parallel to said axes, and means for moving said member upwardly from a position no higher than the upper surface of said plates to a position above the upper surface of said plates thereby to cause articles to overbalance toward one plate or the other.

3. Apparatus as claimed in claim 1, said placing means comprising a support which is substantially coplanar with the upper surfaces of the two horizontal plates in their horizontal raised position, and slide means for pushing articles of said support and onto said plates in a direction substantially parallel to said axes.

4. Apparatus as claimed in claim 1, and a detent ahead of said plates with respect to the direction in which said belt conveyor travels, said detent limiting the movement of articles in a direction opposed to that of the movement of the belt conveyor and being spaced from the lower edge of the adjacent said plate in the lowered position thereof a distance which is about the same as the distance between said belt conveyor and said edge of said adjacent plate in said lowered position thereof.